(12) United States Patent
Jacob et al.

(10) Patent No.: US 11,396,601 B2
(45) Date of Patent: *Jul. 26, 2022

(54) METHOD FOR PRODUCING A SILANE, METHOD FOR MODIFYING A SILICA WITH THE SILANE, AND MODIFIED SILICA

(71) Applicant: Continental Reifen Deutschland GmbH, Hannover (DE)

(72) Inventors: Andreas Jacob, Hannover (DE); David-Raphael Dauer, Hannover (DE); Julian Strohmeier, Einbeck (DE); Julia Schoeffel, Hannover (DE); Carla Recker, Hannover (DE); Kirsten Schwekendiek, Wunstorf (DE); Norbert Mueller, Nienhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 348 days.

This patent is subject to a terminal disclaimer.

(21) Appl. No.: 16/622,970

(22) PCT Filed: May 14, 2018

(86) PCT No.: PCT/EP2018/062293
§ 371 (c)(1),
(2) Date: Dec. 16, 2019

(87) PCT Pub. No.: WO2019/001823
PCT Pub. Date: Jan. 3, 2019

(65) Prior Publication Data
US 2021/0147689 A1     May 20, 2021

(30) Foreign Application Priority Data
Jun. 30, 2017   (DE) .................. 10 2017 211 110.0

(51) Int. Cl.
  *C09C 1/30*    (2006.01)
  *C07F 7/18*    (2006.01)
  *C08K 3/36*    (2006.01)
  *C08K 9/06*    (2006.01)

(52) U.S. Cl.
  CPC .......... *C09C 1/3081* (2013.01); *C07F 7/1804* (2013.01); *C07F 7/1892* (2013.01); *C08K 3/36* (2013.01); *C08K 9/06* (2013.01)

(58) Field of Classification Search
  CPC ............ C09C 1/3081; C08K 3/36; C08K 9/06
  See application file for complete search history.

(56) References Cited

U.S. PATENT DOCUMENTS

| 4,229,333 | A | 10/1980 | Wolff et al. |
| 5,068,445 | A | 11/1991 | Arretz |
| 6,118,001 | A | 9/2000 | Owen et al. |
| 9,527,873 | B2 * | 12/2016 | Röben .................. C07F 7/1804 |
| 10,858,499 | B1 * | 12/2020 | Jacob ..................... C08L 21/00 |
| 2010/0280239 | A1 | 11/2010 | Shooshtari et al. |
| 2012/0067249 | A1 * | 3/2012 | Woods ................. C07F 7/1804 556/428 |
| 2015/0284538 | A1 * | 10/2015 | Joly .................... C08F 230/085 556/420 |
| 2015/0329573 | A1 * | 11/2015 | Moser .................. C07F 7/1804 556/421 |
| 2015/0329574 | A1 * | 11/2015 | Moser .................. C07F 7/0892 556/421 |
| 2017/0073508 | A1 | 3/2017 | Schwekendiek et al. |
| 2020/0392307 | A1 * | 12/2020 | Jacob ..................... C07F 7/081 |
| 2021/0009610 | A1 * | 1/2021 | Dauer .................. C07F 7/1804 |
| 2021/0324183 | A1 * | 10/2021 | Schöffel ................... B60C 1/00 |

FOREIGN PATENT DOCUMENTS

| DE | 2255577 A1 | 6/1974 |
| DE | 2536674 A1 | 2/1977 |
| EP | 2944640 A1 | 11/2015 |
| GB | 1439247 A | 6/1976 |

(Continued)

OTHER PUBLICATIONS

K. Wang et al., 34 Journal of Sulfur Chemistry (2013) (Year: 2013).*
International Search Report dated Jul. 20, 2018 of international application PCT/EP2018/062293 on which this application is based.
Notice of Allowance of counterpart application JP 2019-564914 (based on PCT/EP2018/062293) dated Nov. 8, 2021.

*Primary Examiner* — Alexander R Pagano
(74) *Attorney, Agent, or Firm* — David L. Cate; Gregory Adams

(57) ABSTRACT

The invention relates to a process for preparing a silane, to a process for modifying a silica with the silane, and to a modified silica.

The process for preparing a silane of the formula I) comprises at least the following steps:

a) providing a substance $(R^1)_o Si\text{—}R^2\text{—}HNC(\!=\!O)NH\text{-}A\text{-}NH_2$;

b) providing a substance $HOC(\!=\!O)\text{-}A\text{-}S_2\text{-}A\text{-}C(\!=\!O)OH$;

c) activating the substance from step b) through reaction with oxalyl chloride to form $ClC(\!=\!O)\text{-}A\text{-}S_2\text{-}A\text{-}C(\!=\!O)Cl$;

d) reacting at least two equivalents of the substance from step a) with one equivalent of the substance from step a), thereby obtaining a silane of the formula I);

e) optionally purifying the silane of the formula I) obtained in step d)

$(R^1)_o Si\text{—}R^2\text{—}HNC(\!=\!O)NH\text{-}A\text{-}HNC(\!=\!O)\text{-}A\text{-}S_k\text{-}A\text{-}C(\!=\!O)NH\text{-}A\text{-}NHC(\!=\!O)\text{—}R^2\text{—}Si(R^1)$,    I)

wherein the groups A within a molecule may be identical or different and are aromatic groups.

12 Claims, No Drawings

(56) References Cited

FOREIGN PATENT DOCUMENTS

| | | |
|---|---|---|
| JP | H026465 A | 1/1990 |
| JP | 2000517297 A | 12/2000 |
| JP | 2002201312 A | 7/2002 |
| JP | 2015218170 A | 12/2015 |
| WO | 2015172915 A1 | 11/2015 |

* cited by examiner

METHOD FOR PRODUCING A SILANE, METHOD FOR MODIFYING A SILICA WITH THE SILANE, AND MODIFIED SILICA

The invention relates to a process for preparing a silane, to a process for modifying a silica with the silane, and to a modified silica.

Silanes are known as additives for rubber mixtures, in particular for vehicle tires, and especially for rubber mixtures comprising at least one silica as filler. Silanes known from the prior art are disclosed, for example, in DE 2536674 C3 and DE 2255577 C3. The silica is here linked to the polymer(s) by means of such silanes, with the silanes accordingly also referred to as coupling agents. The attachment of the silica by means of silane coupling agents is advantageous to the rolling resistance characteristics and processability of the rubber mixture. Such silanes normally have at least one sulfur moiety, which is involved in the vulcanization of the rubber mixture.

In addition to the properties mentioned, other properties of the rubber mixture play an important role too, especially when used in vehicle tires, such as in particular the stiffness of the mixture, which affects inter alia the handling characteristics of the vehicle tire.

WO 2015/172915 A1 discloses a rubber mixture comprising a urea-containing silane that has higher stiffness compared to the prior art but retains almost unchanged indicators for rolling resistance and wet grip. The urea group is present here in the so-called spacer, i.e. the spacing group between silicon (linking to the filler) and sulfur (linking to the diene rubber).

JP P2002-201312 A proposes silanes for rubber mixtures that have a urea moiety or an acid amide and a phenyl radical in the spacing group which are said to achieve improved dispersion of carbon black or silica as fillers in the rubber mixture.

The present invention has for its object to provide a process for preparing a novel silane and a form of the silane suitable particularly for addition to a rubber mixture.

If used in a rubber mixture, particularly for vehicle tires, the silane needs to achieve further improvement over the prior art in stiffness and thus in the handling predictors of the rubber mixture.

The object is achieved by the process according to the invention as claimed in claims 1 and 11, the silane according to the invention as claimed in claim 10, and the modified silica according to the invention as claimed in claim 12.

The process according to the invention as claimed in claim 1 prepares a silane of the formula I):

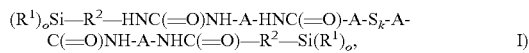

$(R^1)_oSi-R^2-HNC(=O)NH-A-HNC(=O)-A-S_k-A-C(=O)NH-A-NHC(=O)-R^2-Si(R^1)_o$,     I)

wherein o may be 1, 2 or 3 and k is an integer equal to or greater than 2 and the radicals $R^1$ within the silyl groups $(R^1)_oSi-$ and on both sides of the molecule may be identical or different and are selected from alkoxy groups having 1 to 10 carbon atoms, cycloalkoxy groups having 4 to 10 carbon atoms, phenoxy groups having 6 bis 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or alkyl polyether groups $-O-(R^6-O)_r-R^5$ wherein $R^6$ are identical or different and branched or unbranched, saturated or unsaturated, aliphatic, aromatic or mixed aliphatic/aromatic divalent $C_1$-$C_{30}$ hydrocarbon groups, preferably $-CH_2-CH_2-$, r is an integer from 1 to 30, preferably 3 to 10, and $R^5$ are unsubstituted or substituted, branched or unbranched, monovalent alkyl, alkenyl, aryl or aralkyl groups, preferably $-C_{13}H_{27}$ alkyl group or two $R^1$ form a cyclic dialkoxy group having 2 to 10 carbon atoms wherein o is then <3, or it is possible for two or more silanes of the formula I) to be coupled via radicals $R^1$; and wherein the radicals $R^2$ are linear or branched alkyl groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms; and wherein the groups A within a molecule may be identical or different and are aromatic groups, wherein the silane may also be present in the form of oligomers formed through hydrolysis and condensation of silanes of the formula I), by at least the following process steps:

a) providing a substance $(R^1)_oSi-R^2-HNC(=O)NH-A-NH_2$;

b) providing a substance $HOC(=O)-A-S_2-A-C(=O)OH$;

c) activating the substance from step b), wherein said substance is suspended in an organic solvent and in the presence of a catalyst reacted with an activator to form $ClC(=O)-A-S_2-A-C(=O)Cl$;

d) reacting at least two equivalents of the substance from step a) with one equivalent of the substance from step c), wherein a solution of the substance from step a) in an organic solvent is brought into contact with a solution of the substance from step c) at room temperature and then stirred for 4 to 18 hours, thereby obtaining a silane of the formula I).

e) optionally purifying the silane of the formula I) obtained in step d).

Compared to silanes known from the prior art, the silane containing the $-R^2-HNC(=O)NH-A-HNC(=O)-A-$ group that is prepared by the process according to the invention has a relatively long spacing group between the Si atoms and the S atoms, which includes at least two aromatic groups A and the linking units $-HNC(=O)NH-$ and $-HNC(=O)-$.

The invention accordingly provides a novel silane and a novel process for preparing this silane. A rubber mixture comprising the silane according to the invention surprisingly shows higher, and thus improved, stiffness, which could be due in particular to the two aromatic groups A that are present in combination with the abovementioned linking units within a spacing group (i.e. on each side of the $S_k$ moiety).

With the process according to the invention as claimed in claim 11, a silica is prepared that is modified with the silane prepared according to the invention. This provides a form of the silane that is particularly suitable for adding to a rubber mixture, in particular for vehicle tires.

For better understanding, the structure and the individual features of the silane of the formula I) are first hereinafter elucidated.

The features and preferred embodiments of the radicals are brought to bear in the process according to the invention through the selection of the corresponding starting substances.

As shown in formula I), the basic construction of the silane takes place symmetrically, with the $S_k$ moiety being regarded as the center.

The —HNC(=O)— groups are carboxamide groups, with the two respective nitrogen atoms on the two sides of the molecule attached to the aromatic group A linking —HNC(=O)NH— and —HNC(=O)—.

The group —HNC(=O)NH— represents a urea group.

The aromatic groups A may in principle be any aromatic group and the A groups on each side of the molecule may be identical or different. The aromatic groups A may here contain heteroatoms and/or bear substituents (for a respective hydrogen atom) on one or more atoms of the aromatic ring system in addition to the substituents specified in the formulas —HNC(=O)NH—, —HNC(=O)—, and $S_k$.

The aromatic groups A are preferably selected from the group consisting of phenyl, naphthyl, pyridyl, pyridazyl, pyrimidyl, pyrazyl, triazyl, quinolyl, pyrrole, furan, thiophene, pyrazole, imidazole, thiazole, and oxazole radicals.

These groups may be linked to the respective aromatic group through all conceivable atoms, in particular carbon atoms, of the aromatic ring system. In a monocyclic aromatic having six ring atoms such as a phenyl radical, this means for example that the groups may be arranged in a para, meta or ortho position relative to one another.

In a particularly advantageous embodiment of the invention, all A groups on each side of the molecule are phenyl radicals.

In a preferred embodiment of the invention, —HNC(=O)NH— and —HNC(=O)— and also —HNC(=O)— and —$S_k$— are in each case arranged in a para position relative to one another in the respective aromatic group A.

This gives the silane an elongated molecular structure that, particularly in a rubber mixture, can contribute to a further increase in the stiffness thereof.

In a further preferred embodiment of the invention, —HNC(=O)NH— and —HNC(=O)— are arranged in a para position relative to one another and —HNC(=O)— and —$S_2$— in an ortho position relative to one another in the respective aromatic group A. This gives the silane a rigid molecular structure that, particularly in a rubber mixture, contributes to a further increase in the stiffness thereof.

In the silane according to the invention, the radicals $R^1$ within the silyl groups $(R^1)_o Si$— and on the two sides of the molecule may be identical or different and are selected from alkoxy groups having 1 to 10 carbon atoms, cycloalkoxy groups having 4 to 10 carbon atoms, phenoxy groups having 6 bis 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides or alkyl polyether groups —O—($R^6$—O)$_r$—$R^5$ wherein $R^6$ are identical or different and branched or unbranched, saturated or unsaturated, aliphatic, aromatic or mixed aliphatic/aromatic divalent $C_1$-$C_{30}$ hydrocarbon groups, preferably —$CH_2$—$CH_2$—, r is an integer from 1 to 30, preferably 3 to 10, and $R^5$ are unsubstituted or substituted, branched or unbranched, monovalent alkyl, alkenyl, aryl or aralkyl groups, preferably —$C_{13}H_{27}$ alkyl group or two $R^1$ form a cyclic dialkoxy group having 2 to 10 carbon atoms wherein o is then <3, or it is possible for two or more silanes of the formula I) to be coupled via radicals $R^1$. All of the recited radicals $R^1$ and linkages may be combined within one silyl group.

Where two silanes of the formula I) are coupled to one other, they share the same radical $R^1$. It is also possible for more than two silanes to be linked together in this manner. Following on from the synthesis of the silane of the formula I), it is thus conceivable for two silanes of the formula I) to be coupled to one another via the radicals $R^1$. It is also possible for more than two silanes to be linked together in this manner, for example via dialkoxy groups.

The silane according to the invention may also comprise oligomers formed through hydrolysis and condensation of silanes of the formula I).

The silane of the formula I) preferably contains, in each silyl group $(R^1)_o Si$—, at least one radical $R^1$ that can serve as a leaving group, in particular alkoxy groups or any other of the recited groups that are attached to the silicon atom by an oxygen atom, or halides.

The radicals $R^1$ preferably comprise alkyl groups having 1 to 6 carbon atoms or alkoxy groups having 1 to 6 carbon atoms, or halides, particularly preferably alkoxy groups having 1 to 6 carbon atoms.

In a particularly advantageous embodiment of the invention, the radicals $R^1$ within the same silyl group $(R^1)_o Si$— are identical and are alkoxy groups having 1 or 2 carbon atoms, i.e. methoxy groups or ethoxy groups, most preferably ethoxy groups, wherein o=3. However, including in the case of oligomers or where two $R^1$ form a dialkoxy group, the remaining radicals $R^1$ are preferably alkyl groups having 1 to 6 carbon atoms, or halides or alkoxy groups having 1 to 6 carbon atoms, preferably 1 or 2 carbon atoms, i.e. methoxy groups or ethoxy groups, most preferably ethoxy groups.

The radicals $R^2$ of the silane prepared according to the invention are linear or branched alkyl groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms.

The radicals $R^2$ are preferably linear or branched alkyl groups having 2 to 8 carbon atoms or cycloalkyl groups having 4 to 8 carbon atoms, such as in particular cyclohexyl radicals.

In a particularly advantageous embodiment of the invention, the radicals $R^2$ are alkyl radicals having 2 to 6 carbon atoms, preferably 2 to 4 carbon atoms, particularly preferably 2 or 3 carbon atoms, with propyl radicals having 3 carbon atoms being most preferred.

The $S_k$ moiety is a sulfide bridge comprising k sulfur atoms, in which the k sulfur atoms are linked in a chain, resulting in a polysulfide moiety in the molecule. The index k is here an integer equal to or greater than 2.

As is known to those skilled in the art, after process steps a) to 0 the disulfide moiety may be converted into polysulfides by sulfurization through the addition of elemental sulfur in a further process step s), whereby k equal to or greater than 3 is obtained, see Wang et al., Journal of Sulfur Chemistry, 2013, 34, 55-66.

The sulfurization may in principle also take place at an earlier stage in the process, particularly in the starting molecules in the synthesis after step b) or c). The synthesis is then continued with the molecules HOC(=O)-A-$S_k$-A-C(=O)OH and ClC(=O)-A-$S_k$-A-C(=O)Cl.

The sulfurization can also take place before the optional purification after step d).

It is preferable fork to be an integer from 2 to 10 (including 2 and 10), more preferably from 2 to 8, most preferably 2, 3 or 4.

Thus, where k is equal to or greater than 3, the $S_2$ group in the molecule from steps a) to e) undergoes sulfurization in a further process step s), resulting in the $S_k$ group having k>2. The silane prepared according to the invention may also be present as a mixture having different k values.

After sulfurization, this results in the following exemplary and preferred structural formulas II) and III), where k is preferably 2 to 8:

II)

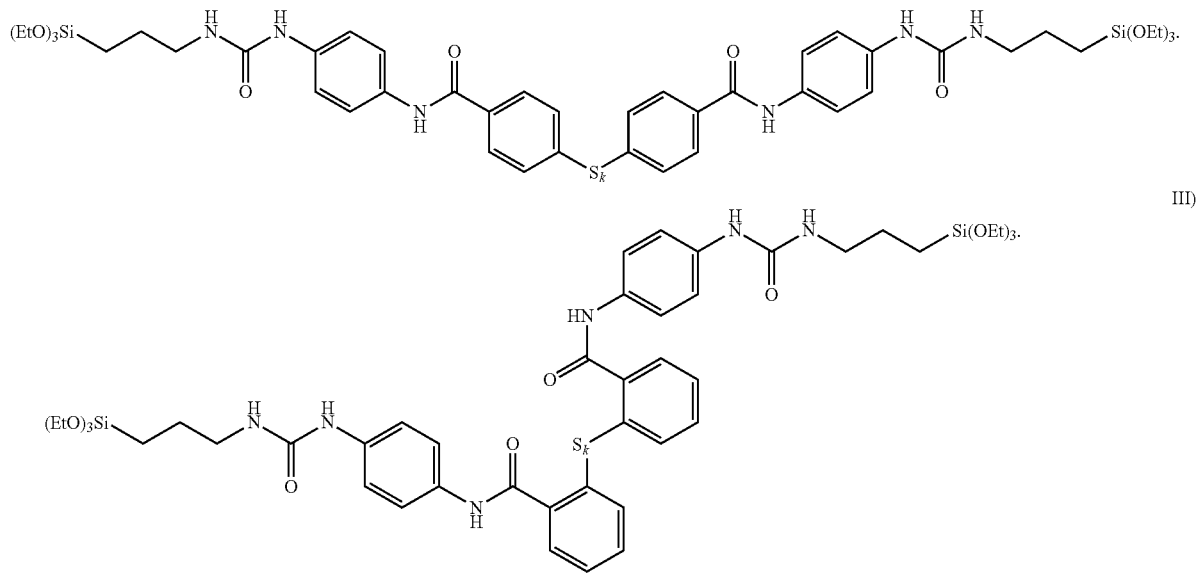

III)

Here, with respect to formula I), all $R^1$ are ethoxy groups, the $R^2$ are propyl radicals, and all A are phenyl radicals, wherein, in the case of molecule II), all linkages are arranged in a para position and, in the case of molecule III), the groups $S_k$— and —C(=O)NH are arranged in an ortho position relative to one another.

In a preferred embodiment of the invention, k=2.

In a particularly preferred and exemplary embodiment of the invention,
k=2 and the silane prepared according to the invention has, for example, formula IV) shown below:

IV)

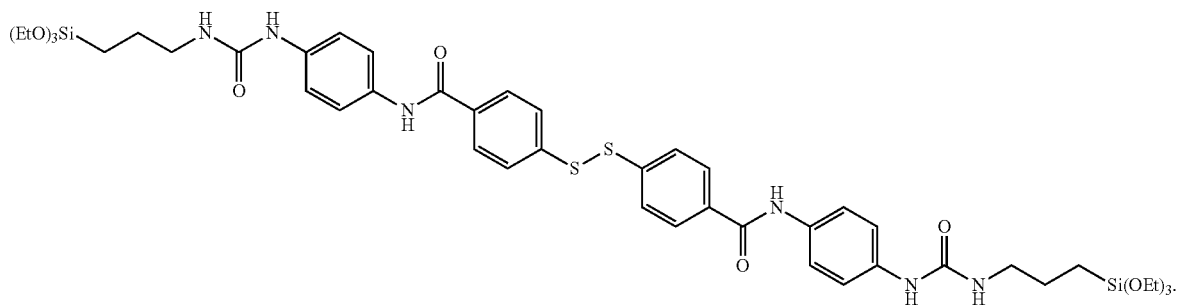

The silane of the formula II) represents a preferred example prepared according to the invention as per process steps a) to d) or e).

In a further particularly preferred and exemplary embodiment of the invention, the silane prepared according to the invention has the formula V) below:

V)

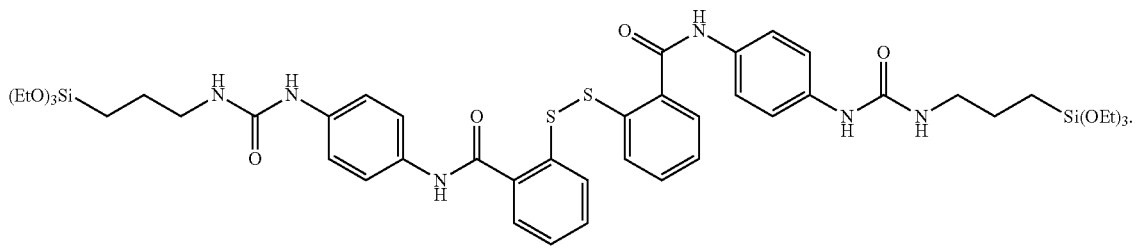

Here, with respect to formula I), k=2 and all $R^1$ are ethoxy groups, the $R^2$ are propyl radicals, —HNC(=O)NH— and —HNC(=O)— are arranged in a para position relative to one another and —HNC(=O)— and —$S_2$— are arranged in an ortho position relative to one other in the respective aromatic group A, and all A are phenyl radicals.

The silane of the formula V) represents a preferred example prepared according to the invention as per process steps a) to d) or e).

The individual process steps a) to e) of the process according to the invention for the preparation of the silane of the formula I) are elucidated hereinafter.

In step a), a substance $(R^1)_o$Si—$R^2$—HNC(=O)NH-A-$NH_2$ is initially provided. For the index o, the radicals $R^1$, $R^2$, and the groups A, all the above statements apply.

The substance $(R^1)_o$Si—$R^2$—HNC(=O)NH-A-$NH_2$ is preferably provided by a process a1) in which a diamino-substituted aromatic $H_2$N-A-$NH_2$ is reacted in an organic solvent with an isocyanato-functionalized silane $(R^1)_o$Si—$R^2$—NCO. This is preferably carried out using 2 equivalents of the diamino-substituted aromatic $H_2$N-A-$NH_2$ and 1 equivalent of the isocyanato-functionalized silane $(R^1)_o$Si—$R^2$—NCO.

In a particularly preferred embodiment of the invention, all $R^1$ are ethoxy groups, $R^2$ is a propyl group, and A is a phenyl radical, with the two amino groups being arranged in a para position (1,4-substitution in the aromatic) relative to one another.

In a preferred embodiment of the invention, the organic solvent is dichloromethane (DCM).

The reaction is preferably carried out at room temperature (RT) and preferably effected by adding the functionalized silane $(R^1)_o$Si—$R^2$—NCO dropwise to the solution of the diamino-substituted aromatic $H_2$N-A-$NH_2$.

The reaction mixture according to step a1) is preferably stirred for 6 to 18 hours, after which the solvent, preferably DCM, is removed under reduced pressure. This is preferably followed by purification, for example column chromatography on silica gel or another suitable purification such as a crystallization process or precipitation.

The product is finally dried, preferably under reduced pressure.

In step b), a substance HOC(=O)-A-$S_2$-A-C(=O)OH is provided. For the groups A, all the above statements concerning the silane structure apply. In a preferred embodiment of the invention, both A are phenyl radicals, with HOC(=O)— and —$S_2$— preferably arranged in a para position (1,4-substitution).

If the disulfide HOC(=O)-A-$S_2$-A-C(=O)OH is not commercially available, this substance in step b) is preferably provided by a process b1) in which at least 2 equivalents of an aromatic thiol HOC(=O)-A-SH are oxidized in an organic solvent in the presence of 1 equivalent of iodine (to prepare 1 equivalent of the disulfide).

The organic solvent for the aromatic thiol is preferably an alcohol, particularly preferably ethanol (EtOH).

The reaction is preferably carried out at room temperature (RT) and preferably effected by adding a saturated ethanolic iodine solution dropwise to a solution of the thiol. The addition is preferably carried out until the reaction mixture has just developed a pale yellow color due to excess iodine.

The resulting reaction mixture is filtered and the residue is preferably washed with cold deionized water and cold ethanol to remove excess iodine, with "cold" meaning refrigerator-cold and preferably a temperature of 0 to +8° C.

The product is finally dried, preferably under reduced pressure.

In process step c), the substance from step b) is activated, wherein it is suspended in an organic solvent and in the presence of a catalyst reacted with an activator to form ClC(=O)-A-$S_2$-A-C(=O)Cl;

The organic solvent in step c) is preferably tetrahydrofuran (THF).

The catalyst is in particular an organic catalyst and particularly preferably comprises catalytic amounts of dimethylformamide (DMF).

The activator is preferably selected from oxalyl chloride and thionyl chloride.

Preference is given to using 1 equivalent of the disulfide from step b) and 10 equivalents of an activator, preferably oxalyl chloride.

The reaction is carried out preferably at 0° C. The activator, for example the oxalyl chloride, is preferably added dropwise to the suspension of the disulfide and stirred for 30 min at 0° C. It is then preferably stirred for 3 h at RT.

The solvent and excess activator are then preferably removed under reduced pressure.

The resulting reaction product may be used in the next step without further purification.

In step d), at least two equivalents of the substance from step a) are reacted with one equivalent of the substance from step c), wherein a solution of the substance from step a) in an organic solvent is brought into contact with a solution of the substance from step c) at room temperature and then stirred for 4 to 18, particularly preferably 6 to 18 hours, thereby obtaining a silane of the formula I).

It is preferable if 2.2 equivalents of the substance from step a) are reacted. The organic solvent in step d) is preferably THF for both substances (from a) and c)).

The reaction is preferably carried out at RT and effected by adding a solution of the disulfide from step c) dropwise to a solution of the substance from step a).

The resulting suspension is then preferably stirred for 6 to 12 hours and then filtered off, resulting in the preparation of a silane of the formula I).

In process step e), the silane of the formula I) obtained in step d) is optionally purified, the nature of the purification being determined by whether the silane is obtained as a solid. In this case, it is for example filtered and the filter cake resulting from the filtration is preferably washed with cold THF and cold deionized water, with "cold" here likewise meaning preferably a temperature of 0 to +8° C. Finally, the product, the silane of the formula I), is preferably dried under reduced pressure.

Otherwise, purification by column chromatography may be considered.

It is however also conceivable for the prepared silane to be used further, for example absorbed onto silica, without a purification step, as described below.

The silane of the formula I) prepared according to the invention is preferably absorbed onto silica in further process steps according to the invention, whereby it is provided in a form that is particularly suitable for adding the silane to a rubber mixture, in particular for vehicle tires.

These further process steps represent a modification of silica with the silane prepared according to the invention.

To this end, the process according to the invention comprises the following further process steps:
f) dissolving the purified silane obtained in process step d) or e) in an organic solvent;
g) bringing at least one silica into contact with the solution from step 0 and then stirring the resulting suspension, preferably for 30 minutes to 18 hours, in particular for 6 to 18 hours;
h) drying the resulting modified silica.

The terms "silicic acid" and "silica" are used synonymously in the context of the present invention.

The silica may be any of the silicas known to those skilled in the art that are suitable as filler for tire rubber mixtures. However, particular preference is given to using a finely divided, precipitated silica that has a nitrogen surface area (BET surface area) (in accordance with DIN ISO 9277 and DIN 66132) of 35 to 400 m$^2$/g, preferably 35 to 350 m$^2$/g, more preferably 100 to 320 m$^2$/g, and most preferably 120 to 235 m$^2$/g, and a CTAB surface area (in accordance with ASTM D 3765) of 30 to 400 m$^2$/g, preferably 30 to 330 m$^2$/g, more preferably 95 to 300 m$^2$/g, and most preferably 115 to 200 m$^2$/g.

Such silicas result, for example, in rubber mixtures for inner tire components, in particularly good physical properties in the vulcanizates. Advantages in mixture processing through a reduction in mixing time are also attainable while retaining the same product characteristics, thus leading to improved productivity. Employable silicas thus include for example not only those of the type Ultrasil® VN3 (trade name) from Evonik but also silicas having a relatively low BET surface area (such as for example Zeosil® 1115 or Zeosil® 1085 from Solvay) and highly dispersible silicas, so-called HD silicas (for example Zeosil® 1165 MP from Solvay).

In process step f), the purified silane obtained in process step d) or e) is dissolved in an organic solvent; The organic solvent in step f) is preferably DMF.

In process step g), at least one silica is brought into contact with the solution from step 0 and the resulting suspension is then stirred, preferably for 30 minutes to 18 hours, more preferably for 4 to 18 hours, and particularly preferably for 6 to 18 hours. Stirring is preferably carried out at a temperature of 120° C.

The desired weight ratio of silane to silica is determined by the amount and concentration of the silane solution and the amount of suspended silica.

The silica may optionally also be brought into contact with the silane in the form of a suspension in an organic solvent, for example DMF.

In process step h), the modified silica that is obtained undergoes final drying. This is done preferably by removing the solvent under reduced pressure and then drying the product preferably for 1 to 3 days under reduced pressure at 20 to 60° C.

The modified silica predried in this manner may optionally be comminuted, depending on the desired fineness. The silica is then preferably dried under reduced pressure for a further 1 to 3 days at 20 to 60° C.

The present invention further provides the modified silica thus obtained after steps f) to h). This silica is particularly suitable as an additive for rubber mixtures for vehicle tires, with the combination of the silane on the silica making the mixture simpler to process and with the silane according to formula I) giving the mixture higher and thus improved stiffness.

The invention is elucidated hereinafter with reference to the synthesis of the silanes of the formula IV) and formula V):

Preparation of the Silane of the Formula IV):

1. Preparation of bis(4-carboxyphenyl) Disulfide According to the Synthesis Scheme Shown in Formula VI)

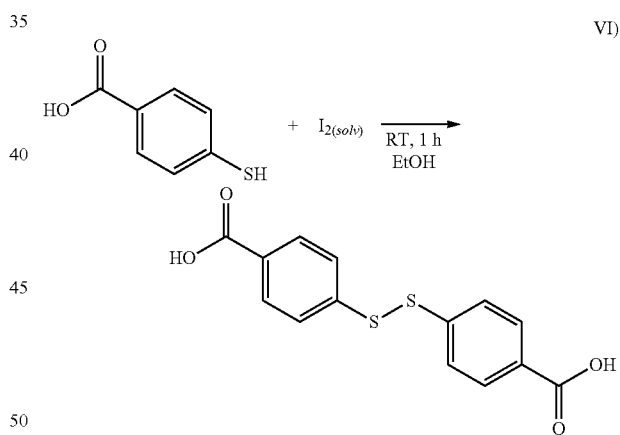

To a solution of 4-mercaptobenzoic acid (7.50 g, 48.6 mmol, 1.0 equiv.) in ethanol (500 mL, EtOH) was added dropwise at room temperature a saturated ethanolic iodine solution (25 mL in total). On addition, the iodine solution decolorized and the reaction mixture became cloudy. The addition of iodine was continued until the resulting suspension acquired a pale yellow color due to excess iodine.

The reaction mixture was then filtered using a Büchner funnel and the residue washed with cold deionized water (4×50 mL) and cold ethanol (4×50 mL) to remove excess iodine. After drying under high vacuum, the target compound was isolated as a white powder (6.69 g, 21.8 mmol, 90%).

$^1$HNMR (500 MHz, DMSO-d$_6$; dimethyl sulfoxide) δ 13.08 (s, 2H), 7.97-7.88 (m, 4H), 7.67-7.59 (m, 4H).

$^{13}$C NMR (126 MHz, DMSO-d$_6$) δ 167.22, 141.16, 130.83, 130.31, 126.54.

2. Preparation of 1-(4'-aminophenyl)-3-(3"-(triethoxysilyl)propyl)urea According to the Synthesis Scheme Shown in Formula VII)

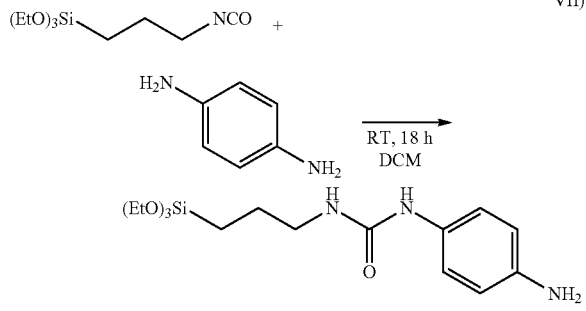

To a solution of para-phenylenediamine (10.00 g, 92.5 mmol, 2.0 equiv.) in dichloromethane (300 mL DCM) was added dropwise at room temperature 3-(isocyanatopropyl)triethoxysilane (11.44 mL, 11.44 g, 46.2 mmol, 1.0 equiv.). After to stirring overnight, the solvent was removed on a rotary evaporator, yielding a gray solid (21.57 g) as the crude product.

This was purified by column chromatography on silica gel (DCM/EtOH 9:1) in several small portions of approx. 3-4 g each (yield in each case approx. 74 wt.-%).

After drying under high vacuum, the target compound was isolated as a light gray powder (extrapolated for the total product: 15.96 g, 44.9 mmol, 97% based on silane).

$^1$H NMR (500 MHz, DMSO-d$_6$) δ 7.82 (s, 1H), 6.98 (d, J=8.7 Hz, 2H), 6.45 (d, J=8.7 Hz, 2H), 5.91 (t, J=5.8 Hz, 1H), 4.66 (s, 2H), 3.74 (q, J=7.0 Hz, 6H), 3.00 (q, J=6.8 Hz, 2H), 1.48-1.39 (m, 2H), 1.14 (t, J=7.0 Hz, 9H), 0.57-0.49 (m, 2H).

$^{13}$C NMR (126 MHz, DMSO-d$_6$) δ 155.69, 143.33, 129.62, 120.22, 114.12, 57.70, 41.81, 23.49, 18.24, 7.25.

3. Preparation of bis(4-carboxylchloridophenyl) disulfide (In Situ) According to the Synthesis Scheme Shown in Formula VIII)

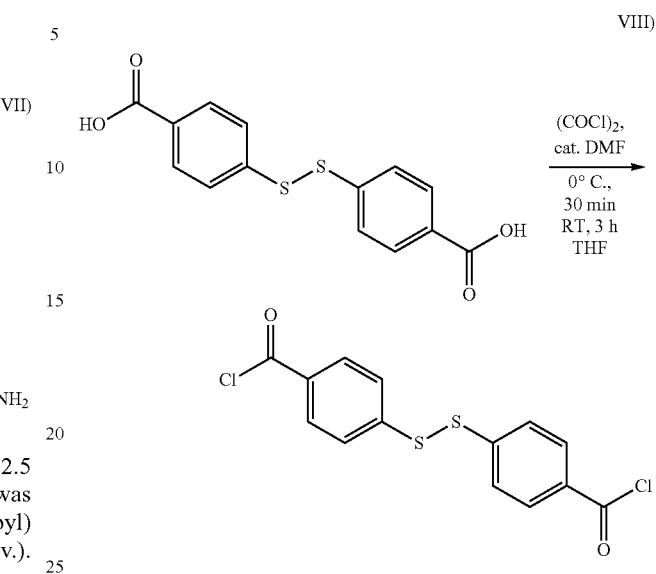

To a suspension of bis(4-carboxyphenyl) disulfide (1.96 g, 6.4 mmol, 1.0 equiv.) in tetrahydrofuran (60 mL THF) was added dimethylformamide (0.1 mL DMF, cat.). Oxalyl chloride (5.49 mL, 8.12 g, 64.0 mmol, 10.0 equiv.) was added dropwise to the reaction to mixture at 0° C. and the mixture was stirred for 30 min at this temperature. The resulting yellow solution was then stirred for a further 3 h at RT. The solvent and excess oxalyl chloride were then distilled off. A yellow solid was isolated that was used for the next step in the synthesis without further analysis or purification (on account of its reactivity).

4. Preparation of the Silane of the Formula IV) According to the Synthesis Scheme Shown in Formula IX)

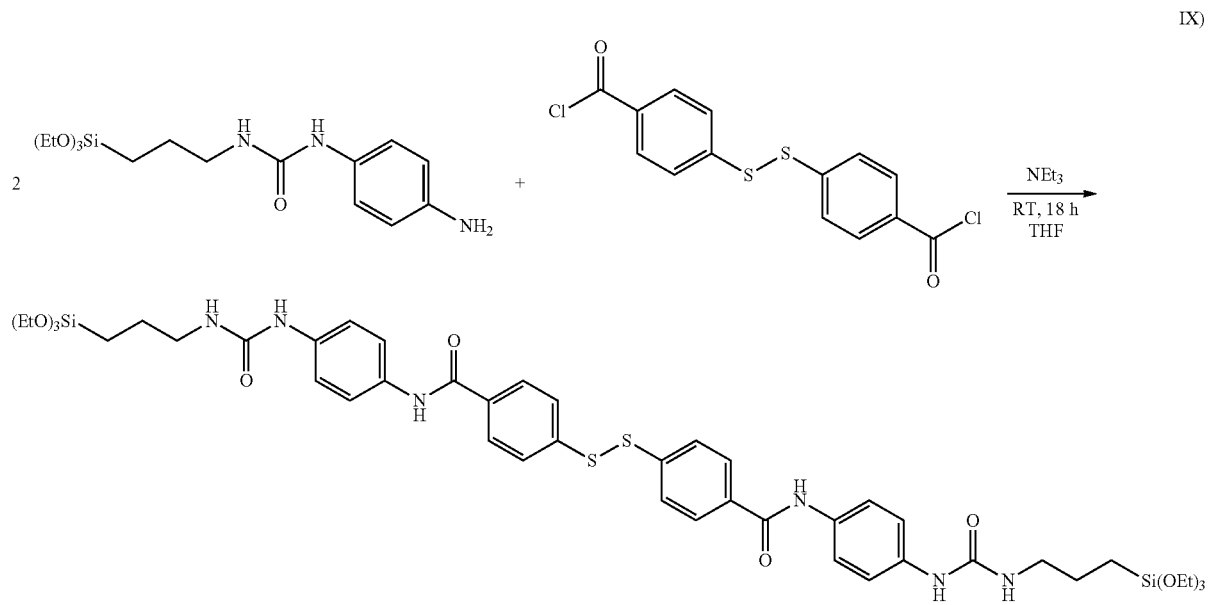

To a solution of 1-(4-aminophenyl)-3-(3-(triethoxysilyl)propyl)urea (2.55 g, 7.17 mmol, 2.2 equiv.) and triethylamine (2.11 mL, 1.65 g, 16.3 mmol, 5.0 equiv.) in THF (10 mL) was added dropwise at RT, over a period of 15 min, a solution of bis(4-carboxylchloridophenyl) disulfide (1.12 g, 3.26 mmol, 1.0 equiv.) in THF (40 mL). The resulting pale yellow suspension was subsequently stirred overnight and then filtered. The filter cake was washed with cold THF (2×10 mL). After drying under high vacuum, the target compound was isolated as a white powder (2.39 g, 2.44 mmol, 75%).

$^1$H NMR (500 MHz, DMSO-d$_6$) δ 10.13 (s, 2H), 8.45 (s, 2H), 7.94 (d, J=8.5 Hz, 4H), 7.67 (d, J=8.6 Hz, 4H), 7.56 (d, J=9.0 Hz, 4H), 7.34 (d, J=9.0 Hz, 4H), 6.23 (t, J=5.8 Hz, 2H), 3.74 (q, J=7.0 Hz, 12H), 3.03 (q, J=6.6 Hz, 4H), 1.52-1.41 (m, 4H), 1.14 (t, J=7.0 Hz, 18H), 0.60-0.51 (m, 4H).

$^{13}$C NMR (126 MHz, DMSO-d$_6$) δ 164.32, 155.34, 139.05, 136.78, 134.16, 132.49, 128.75, 126.38, 121.10, 117.79, 57.80, 56.12, 41.84, 23.45, 18.31, 7.32.

$^{29}$Si NMR (99 MHz, DMSO-d$_6$) δ −44.52.

The prepared silane of the formula IV is preferably absorbed onto a silica, i.e. a silica is preferably modified with the prepared silane of the formula IV).

Absorption onto silica is carried out, for example as follows:

To a suspension of granulated silica in DMF is added at room temperature a solution of the silane of the formula IV) in the desired silica/silane ratio dissolved in DMF. For example 31.2 g of silica (VN3, Evonik) and 4.62 g of silane of the formula IV) are used. The resulting suspension is stirred for 6-18 hours at 120° C., after which the solvent is removed under reduced pressure. After drying under high vacuum for one day at 40° C., the resulting modified silica is comminuted. It is then dried under high vacuum for one day further at 40° C.

Preparation of the Silane of the Formula V):

The preparation of silane V), i.e. of the silane with a linkage comprising an ortho-disulfide group, is carried out in essentially analogous manner to the preparation of silane IV). The differences only are therefore described below.

The synthesis starts from the commercially available bis(2-carboxyphenyl) disulfide, which is reacted with oxalyl chloride according to scheme X) to form bis(2-carboxylchloridophenyl) disulfide:

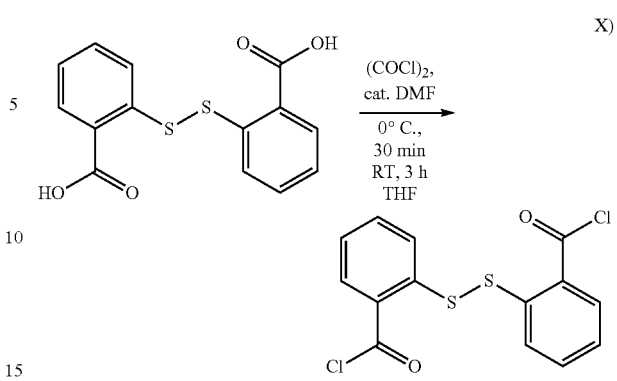

To a suspension of bis(2-carboxyphenyl) disulfide (2.94 g, 9.6 mmol, 1.0 equiv.) in THF (60 mL) was added DMF (0.15 mL, cat.). Oxalyl chloride (8.23 mL, 12.19 g, 96.0 mmol, 10.0 equiv.) was added dropwise to the reaction mixture at 0° C. and the mixture was stirred for 30 min at this temperature. The resulting yellow solution was then stirred for a further 3 h at RT. The solvent and excess oxalyl chloride were then distilled off.

A yellow solid was isolated that was used for the next step in the synthesis without further analysis or purification (on account of its reactivity).

This was followed by the reaction according to synthesis scheme XI) with 1-(4-aminophenyl)-3-(3-(triethoxysilyl)propyl)urea, which is prepared as described above.

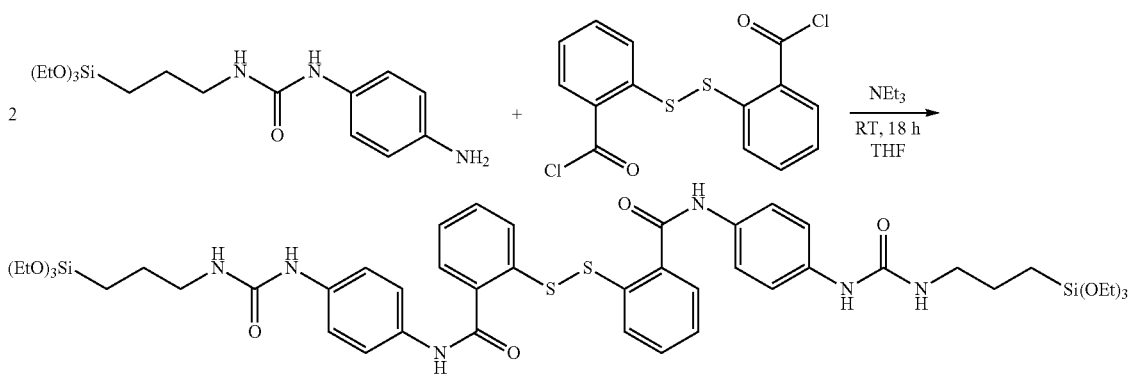

To a solution of 1-(4-aminophenyl)-3-(3-(triethoxysilyl)propyl)urea (7.51 g, 21.1 mmol, 2.2 equiv.) and triethylamine (6.65 mL, 4.86 g, 48.0 mmol, 5.0 equiv.) in THF (30 mL) was added dropwise at RT, over a period of 15 min, a solution of bis(2-carboxylchloridophenyl) disulfide (3.30 g, 9.6 mmol, 1.0 equiv.) in THF (80 mL). The resulting pale yellow suspension was subsequently stirred overnight and then filtered. The filtrate was concentrated and the additional solid that precipitated was filtered off again. The filter cake was washed with cold THF (2×25 mL) and deionized water (2×25 mL). After drying under high vacuum, the target compound was isolated as a white powder (2.70 g, 2.75 mmol, 29%).

$^1$H NMR (500 MHz, DMSO-d$_6$) δ 10.41 (s, 2H), 8.39 (s, 2H), 7.76 (d, J=7.6 Hz, 1H), 7.72 (d, J=8.1 Hz, 1H), 7.60 (d, J=9.0 Hz, 3H), 7.50 (ddd, J=8.5, 7.4, 1.5 Hz, 2H), 7.40-7.34 (m, 6H), 6.14 (t, J=5.7 Hz, 2H), 3.75 (q, J=7.0 Hz, 12H), 3.05 (q, J=6.6 Hz, 4H), 1.54-1.42 (m, 4H), 1.15 (t, J=7.0 Hz, 18H), 0.63-0.51 (m, 4H).

$^{13}$C NMR (126 MHz, DMSO-d$_6$) δ 165.20, 155.21, 136.85, 136.49, 134.67, 132.32, 131.30, 128.37, 126.25, 126.09, 120.76, 117.77, 57.73, 41.77, 23.39, 18.25, 7.27.
$^{29}$Si NMR (99 MHz, DMSO-d$_6$) δ −44.57.

The prepared silane of the formula V) is preferably absorbed onto a silica, i.e. a silica is preferably modified with the prepared silane of the formula V).

Absorption onto silica is carried out for example as described above for the silane of the formula IV).

Exemplary rubber mixtures comprising the silanes of the formula IV) or V) are hereinafter described and compared to rubber mixtures comprising a silane known from the prior art.

The compositions and results are summarized in table 1. The comparative mixtures are identified with a C, the mixtures comprising the silanes according to the invention with an I. The mixtures C1 and I1, and C2 and E2, and C3 and E3 and E4 in each case comprise molar equivalent amounts of the silane from the prior art (C1, C2, C3) or of the silane IV) according to the invention (I1, I2, I3) or of the silane V) according to the invention (I4).

The silanes are in each case supported on the silica (95 phr in each mixture) so that the respective silane-modified silica was mixed in. The amounts thus refer to the products of the modification reactions, with 95 phr of silica being used in each mixture. The residual amount (difference: table value minus 95 phr) thus represents the silica-bound silane.

The mixtures were otherwise prepared by the process customary in the rubber industry under standard conditions in two stages in a laboratory mixer having a capacity of 80 milliliters to 3 liters in which, in the first mixing stage (base mixing stage), all constituents aside from the vulcanization system (sulfur and vulcanization-influencing substances) were first mixed at 145 to 165° C., with target temperatures of 152 to 157° C., for 200 to 600 seconds. Addition of the vulcanization system in the second stage (final mixing stage) resulted in the preparation of the final mixture, with mixing at 90 to 120° C. for 180 to 300 seconds.

All of the mixtures were used to prepare test specimens by vulcanization to t$_{95}$ (measured on a moving disk rheometer to ASTM D 5289-12/ISO 6502) under pressure at 160° C., and these test specimens were used to determine material properties that are typical in the rubber industry by the test methods specified hereinafter.

Shore A hardness (Sh A) at room temperature in accordance with ISO 868

Rebound resilience at room temperature in accordance with ISO 4662

Dynamic storage modulus E' at 55° C. in accordance with DIN 53 513 at 0.15% and 6% elongation Stress value at 50%, 100%, 200%, 300%, and 400% elongation at room temperature in accordance with ISO 37, test specimen type 3 dumbbell Substances Used:
a) Silica Ultrasil® VN3, Evonik, in each case 95 phr, remainder in each case bound silane
b) TESPD (3,3'-bis(triethoxysilylpropyl) disulfide)
c) Silane according to the invention of formula IV), prepared as described above
d) Silane according to the invention of formula V), prepared as described above
e) Aging stabilizers, antiozonant wax, zinc oxide, stearic acid
f) DPG and CBS.

As can be seen in Table 1, the rubber mixtures I1 to I4 have higher stiffness values and higher hardness. The inventive examples, i.e. the mixtures comprising the silanes prepared according to the invention, thus in particular show improved handling indicators. The examples I1 to I3 according to the invention comprising the silane according to formula IV) have lower rebound resilience (compared to C1 to C3) and thus additionally have improved wet-braking indicators.

TABLE 1

|  | Unit | C1 | C2 | C3 | I1 | I2 | I3 | I4 |
| --- | --- | --- | --- | --- | --- | --- | --- | --- |
| Constituents |  |  |  |  |  |  |  |  |
| NR | phr | 20 | 20 | 20 | 20 | 20 | 20 | 20 |
| SSBR | phr | 80 | 80 | 80 | 80 | 80 | 80 | 80 |
| TDAE | phr | 35 | 35 | 35 | 35 | 35 | 35 | 35 |
| Silica $^{a)}$ + TESPD $^{b)}$ | phr | 98.4 | 99.4 | 100.5 | — | — | — | — |
| Silica $^{a)}$ + silane IV) $^{c)}$ | phr | — | — | — | 102.7 | 105.2 | 107.8 | — |
| Silica $^{a)}$ + silane V) $^{d)}$ | phr | — | — | — | — | — | — | 107.8 |
| Other additives $^{e)}$ | phr | 9 | 9 | 9 | 9 | 9 | 9 | 9 |
| Accelerator $^{f)}$ | phr | 3.6 | 3.6 | 3.6 | 3.6 | 3.6 | 3.6 | 3.6 |
| Sulfur | phr | 2 | 2 | 2 | 2 | 2 | 2 | 2 |
| Properties |  |  |  |  |  |  |  |  |
| S50 | MPa | 1.1 | 1.2 | 1.2 | 1.4 | 1.5 | 1.9 | 1.8 |
| S100 | MPa | 1.9 | 1.9 | 2.0 | 2.3 | 2.6 | 3.1 | 3.0 |
| S200 | MPa | 3.9 | 4.0 | 4.2 | 4.7 | 5.8 | 6.3 | 6.1 |
| S300 | MPa | 6.3 | 6.6 | 7.0 | 7.6 | 9.6 | 10.1 | 9.7 |
| S400 | MPa | 9.0 | 9.2 | 9.9 | 10.8 | 13.4 | 13.8 | 13.3 |
| E' (6%) | MPa | 8.5 | 9.5 | 8.3 | 10.1 | 10.5 | 11.6 | 10.9 |
| E' (0.15%) | MPa | 17.0 | 18.7 | 16.0 | 21.5 | 21.6 | 24.9 | 29.8 |
| Hardness RT | Sh A | 71.4 | 71.9 | 71.5 | 75 | 77.9 | 79 | 79.7 |
| Rebound elasticity RT | % | 17.4 | 17.4 | 18 | 15.8 | 16.6 | 15.8 | 25.4 |

The invention claimed is:

1. A process for preparing a silane according to formula I):

$(R^1)_o$Si—$R^2$—HNC(=O)NH-A-HNC(=O)-A-$S_k$-A-C(=O)NH-A-NHC(=O)NH—$R^2$—Si$(R^1)_o$,   I)

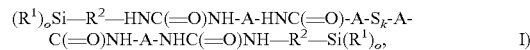

wherein o may be 1, 2 or 3 and k is an integer equal to or greater than 2 and the radicals $R^1$ within the silyl groups $(R^1)_o$Si— and on both sides of the molecule may be identical or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or alkyl polyether groups —O—(R$^6$—O)$_r$—R$^5$ wherein R$^6$ are identical or different and branched or unbranched, saturated or unsaturated, aliphatic, aromatic or mixed aliphatic/aromatic divalent C$_1$-C$_{30}$ hydrocarbon groups, r is an integer from 1 to 30, and R$^5$ are unsubstituted or substituted, branched or unbranched, monovalent alkyl, alkenyl, aryl or aralkyl groups, or two R$^1$ form a cyclic dialkoxy group having 2 to 10 carbon atoms wherein o is then <3, or optionally two or more silanes of the formula I) to be coupled via radicals R$^1$; and wherein the radicals R$^2$ are linear or branched alkyl groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms; and wherein each occurrence of the groups A may be identical or different and are aromatic groups, wherein the silane may also be present in the form of oligomers formed through hydrolysis and condensation of silanes of the formula I);

wherein the process comprises at least the following process steps:
  a) providing a substance (R$^1$)$_o$Si—R$^2$—HNC(=O) NH-A-NH$_2$;
  b) providing a substance HOC(=O)-A-S$_2$-A-C(=O) OH;
  c) activating the substance from step b), wherein said substance is suspended in an organic solvent and in the presence of a catalyst reacted with an activator to form ClC(=O)-A-S$_2$-A-C(=O)Cl;
  d) reacting at least two equivalents of the substance from step a) with one equivalent of the substance from step b) in an organic solvent then bringing a reaction product from the reaction of the substance of step a) with the substance of step b) into contact with a solution of the substance from step c) at room temperature and stirring, thereby obtaining a silane of the formula I);
  e) optionally purifying the silane of the formula I) obtained in step d).

2. The process as claimed in claim 1, wherein the substance in step a) is provided by reacting a diamino-substituted aromatic H$_2$N-A-NH$_2$ in an organic solvent with an isocyanato-functionalized silane (R$^1$)$_o$Si—R$^2$—NCO.

3. The process as claimed in claim 1, wherein the substance in step b) is provided by oxidation of an aromatic thiol HOC(=O)-A-SH in an organic solvent in the presence of iodine.

4. The process as claimed in claim 1, wherein the aromatic groups A are selected from the group consisting of phenyl, naphthyl, pyridyl, pyridazyl, pyrimidyl, pyrazyl, triazyl, quinolyl, pyrrole, furan, thiophene, pyrazole, imidazole, thiazole, and oxazole radicals.

5. The process as claimed in claim 1, wherein the radicals R$^1$ are alkyl groups having 1 to 6 carbon atoms or alkoxy groups having 1 to 6 carbon atoms, or halides.

6. The process as claimed in claim 1, wherein the radicals R$^2$ are linear or branched alkyl groups having 2 to 8 carbon atoms or cycloalkyl groups having 4 to 8 carbon atoms.

7. The process as claimed in claim 1, wherein the prepared silane of the formula I) has the formula II) below:

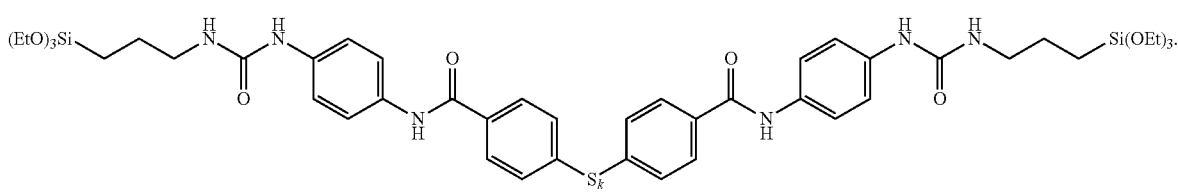

II)

8. The process as claimed in claim 1, wherein the prepared silane of the formula I) has the formula III) below:

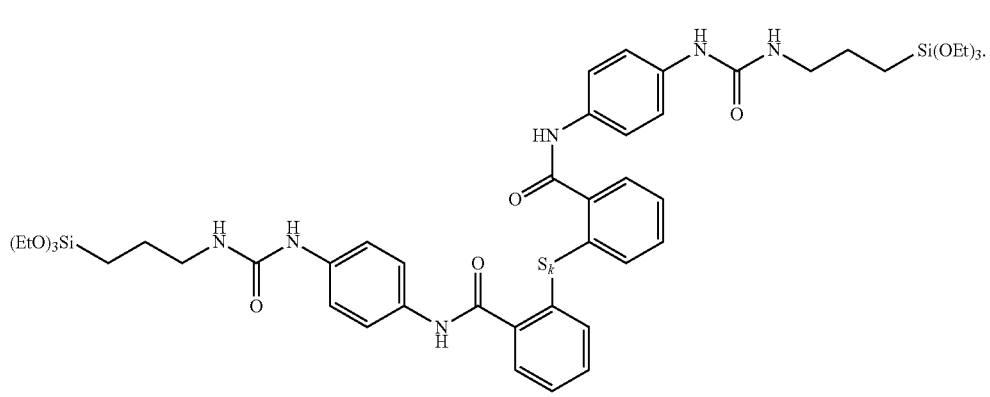

III)

9. The process as claimed in claim 1, wherein sulfurization is carried out through the addition of elemental sulfur to the silane of formula I), wherein k is an integer from 2 to 8 in a further process step s), whereby the silane of formula I), wherein k is equal to or greater than 3, is obtained.

10. A silane prepared by the process as claimed in claim 1.

11. A process for preparing a silica that is modified with at least one silane prepared as claimed in claim 1, wherein the process comprises at least the following process steps:
   f) dissolving the purified silane obtained in process step d) or e) in an organic solvent;
   g) bringing at least one silica into contact with the solution from step f) and then stirring the resulting suspension;
   h) drying the resulting modified silica.

12. A modified silica prepared by the process as claimed in claim 11.

* * * * *